United States Patent [19]

Kaltenthaler et al.

[11] Patent Number: 5,114,315

[45] Date of Patent: May 19, 1992

[54] CLUTCH CONTROL SYSTEM FOR AN AIR COMPRESSOR

[75] Inventors: Wolfgang Kaltenthaler, Wennigsen; Karl-Heinrich Schönfeld, Seelze, both of Fed. Rep. of Germany

[73] Assignee: WABCO Westinghouse Fahrzeugbremsen GmbH, Hanover, Fed. Rep. of Germany

[21] Appl. No.: 487,759

[22] Filed: Mar. 1, 1990

[30] Foreign Application Priority Data

Mar. 2, 1989 [DE] Fed. Rep. of Germany ....... 3906534
Jul. 19, 1989 [DE] Fed. Rep. of Germany ....... 3923882

[51] Int. Cl.$^5$ .............................................. F04B 49/06
[52] U.S. Cl. ........................................ 417/18; 417/22; 417/58; 417/212; 417/3207
[58] Field of Search .............. 417/18, 22, 212, 53, 417/307; 62/133

[56] References Cited

U.S. PATENT DOCUMENTS

| | | | |
|---|---|---|---|
| 3,101,187 | 8/1963 | Campbell | 417/307 |
| 4,391,242 | 7/1983 | Mashio | 62/133 |
| 4,424,682 | 1/1984 | Miska et al. | 62/133 |
| 4,642,770 | 2/1987 | Shirley | 62/133 |

*Primary Examiner*—Richard A. Bertsch
*Assistant Examiner*—David W. Scheuermann
*Attorney, Agent, or Firm*—Horst M. Kasper

[57] ABSTRACT

An apparatus for the generation of compressed air is disclosed, where the supply of air from the compressor (1) to the user (6) is interrupted in case of preset user-side pressure. This apparatus prevents a freezing in case of low ambient temperatures in the pressure lines in which condensed water has formed. A temperature sensitive switching device (14, 29) responds to the actual ambient temperature. The switching device (14) does not stop the compressor (1) in case of a preset user-side pressure and in case of a falling below of a preset ambient temperature. The compressor (1) carries then the warmed-up air through a region of the device before discharging it into the surrounding atmosphere. The device is particularly suited for compressed-air generation plants in motor vehicles which are adapted to be used in cases of low ambient temperatures.

22 Claims, 3 Drawing Sheets

CLUTCH CONTROL SYSTEM FOR AN AIR COMPRESSOR

BACKGROUND OF THE INVENTION

1. Field of the Invention

The invention relates to a device for the generation of compressed air comprising a compressor which supplies air to a user via a pressure line and where a pressure controller is furnished in the pressure line.

2. Brief Description of the Background of the Invention Including Prior Art

Such a device is known from the European Patent Application EP-B1-0,051,760. According to this reference, a pressure controller is employed for the interruption of the supply of air to a user if a predetermined pressure has been reached on the user side. The pressure controller blocks the supply stream from the compressor versus the user and diverts the supply stream into the atmosphere. In addition to a pressure control by way of the pressure controller, the compressor is in this case switched off by disengaging the compressor from its drive by uncoupling of a coupling.

It also known to employ either the pressure controller of the recited kind or to effect the interruption of the supply by stopping the compressor. The two possibilities of the supply interruption can be employed simultaneously, as is the case in the conventional construction. This is associated with the advantage that energy is saved during a stopping of the compressor, and that, upon renewed turning on of the compressor, the compressor has to overcome only a small starting torque when starting a feeding of air into the supply line vented by the pressure controller.

However, the stopping of the compressor in the non-supply phase is associated with the disadvantage that in particular the line section from the compressor to the pressure controller is subjected to substantial temperature variations. Based on these temperature variations, there can occur an undesirably high concentration of condensed water in the recited line section and in following labyrinth of the pressure controller. The recited region of the device tends consequently to icing, in particular in case of low ambient temperatures. This in turn has the result that, in case of a renewed requirement of compressed air, the compressor can only feed toward a pressure side blocked by icing.

SUMMARY OF THE INVENTION

Purposes of the Invention

It is an object of the present invention to improve a compressed-air supply system such that the icing and freezing possibilities are avoided and the operational safety of the device is increased.

It is another object of the invention to provide a control of a compressed-air supply which is effectively adapted to the requirements of a troublesome environment and of heavy-duty use.

It is yet a further object of the present invention to provide a reliable switching mechanism for a compressor depending on the load requirements.

These and other objects and advantages of the present invention will become evident from the description which follows.

Brief Description of the Invention

The present invention provides for a device for the generation of compressed air. A pressure line has an end connected to a user. A compressor is connected to the pressure line for supplying air via a pressure line to the user. A pressure controller is disposed in the pressure line. The pressure controller blocks a supply stream from the compressor to the user through a user-side pressure and diverts said supply stream into the atmosphere upon reaching or, respectively, surpassing of a preset and defined pressure value. A switchable coupling is connected to the compressor, by way of which the compressor can be separated from its drive. A switching means is provided for connecting to the switchable coupling. A coupling control device is connected to the switching means for controlling the switching means. A temperature sensor is connected to the coupling control device for furnishing an ambient temperature-dependent signal. A pressure sensor communicates the pressure in the pressure line on its end toward the user and furnishes a pressure signal, derived from a pressure prevailing at the user side. The temperature dependent signal and the pressure signal are fed to the coupling control device. The coupling control device serves for combining the two signals such that the coupling separates the compressor from its drive in case the ambient temperature is above a preset temperature value and the user-side pressure is above a preset user-side pressure.

The coupling can be formed as a pneumatically actuatable shut-off coupling. The shut-off coupling can be charged with the user-side pressure for separation of the compressor from its drive at a pneumatic control input. The coupling control device can further comprise a directional control valve connected to the pneumatic control input. The charging of the shut-off coupling with the user-side pressure can be performed via the directional control valve. The directional control valve can be actuatable by the temperature-sensitive switching device.

A control output port can be connected to the coupling control device. The directional control valve can be electrically controlled and can be disposed between the pneumatic control input and a control output port. The control output port can carry the user-side pressure. The electric control of the directional control valve can be performed via the temperature-dependent switching device. The coupling control device can further comprise a pressure control means. The pressure control means can transmit the pressure on the user side only in such cases where the supply stream from the compressor to the user is blocked for the user.

The directional control valve can be provided electrically controllable and can be disposed between the pneumatic control input and the output of the pressure controller feeding the user. The electric control of the directional control valve can be performed via a series circuit made of a temperature-dependent switching device and of a pneumatically actuatable pressure switch. The pneumatically actuatable pressure switch can exhibit a pneumatic control input port. The pneumatic control input port can be connected with a control output port of the pressure controller. The control output port can carry the user-side pressure. The pressure controller can be formed such that the control output port carries the user-side pressure only when the supply stream from the compressor to the user is blocked versus the user.

The coupling can be formed as an electrically actuatable shut-off coupling. The compressor can be separated from its drive in a currentless state of the electric actuating device of the shut-off coupling. The electric control input can be connected via a temperature-dependent switching device to an electric energy source. An electric, pneumatically actuatable pressure switch can be disposed parallel to the temperature-dependent switching device. The pressure switch can exhibit a pneumatic control input port. The control input port can be connected to a control output port of the coupling control device. The control output port can carry the pressure on the user side. The coupling control device can include pressure control means restricting the user-side pressure carried by the control output port only to cases where the supply stream from the compressor to the user is blocked versus the user.

More particularly, a device for the generation of compressed air comprises a first pressure line connected to the compressor. A series connection of a fluid conditioner and of a check valve is connected at a first end to the first pressure line. A second pressure line is connected to a second end of the series connection of fluid conditioner and check valve. A two-way valve is connected to the first pressure line. A control output port is connected to the two-way valve. A first directional control valve is connected with one side to the control output port and with a second side to the second pressure line. A coupling is connected to the compressor. A compressor drive is connected for providing energy to the coupling. A control input is disposed at the compressor drive for receiving control signals for the coupling. Temperature-sensitive switching means are connected, on a first side, to the control output port and, on a second side, to the control input.

The temperature-sensitive switching means can comprise a first pneumatic line section connected to the control input formed as a pneumatic input. A directional control valve having a port side can be connected to the first pneumatic line section. A second pneumatic line section, having an end, can be connected to a second side of the directional control valve and, with a second end, to the control output port. A second control input can be disposed at the directional control valve. A temperature-sensitive switching device can be connected to the second control input. An energy source can be connected to the temperature-sensitive switching device for energizing the temperature-sensitive switching device.

The temperature-sensitive switching means can comprise a first pneumatic line section connected to the control input formed as a pneumatic control input. A directional control valve, having a port side, can be connected to the first pneumatic line section. A second pneumatic line section, having an end, can be connected to a second side of the directional control valve and, with a second end, to the second pressure line. A second control input can be disposed at the directional control valve. A pressure switch can be connected to the control input port and to the second control input. A temperature-sensitive switching device can be connected to the pressure switch. An energy source can be connected to the temperature-sensitive switching device for energizing the temperature-sensitive switching device.

The temperature-sensitive switching means can comprise a first electric line section connected to the control input formed as an electric control input. An electric switch can be connected to the first electric line section. A pneumatic control input can be disposed at the electric switch and be connected to the control output port. An electrical energy source can be connected to the electric switch. A second electric line section can be connected to the first electric line section. A temperature-sensitive switching device can be connected to the second line section. A third electric line section can be connected to the temperature-sensitive switching device and to the electric energy source.

The invention is associated with the advantage that, in case of an already installed apparatus of the initially recited kind, it is possible to retrofit such plants with the features of the invention without large expenditures, since no structural changes are required either at the compressor or at the pressure controller.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
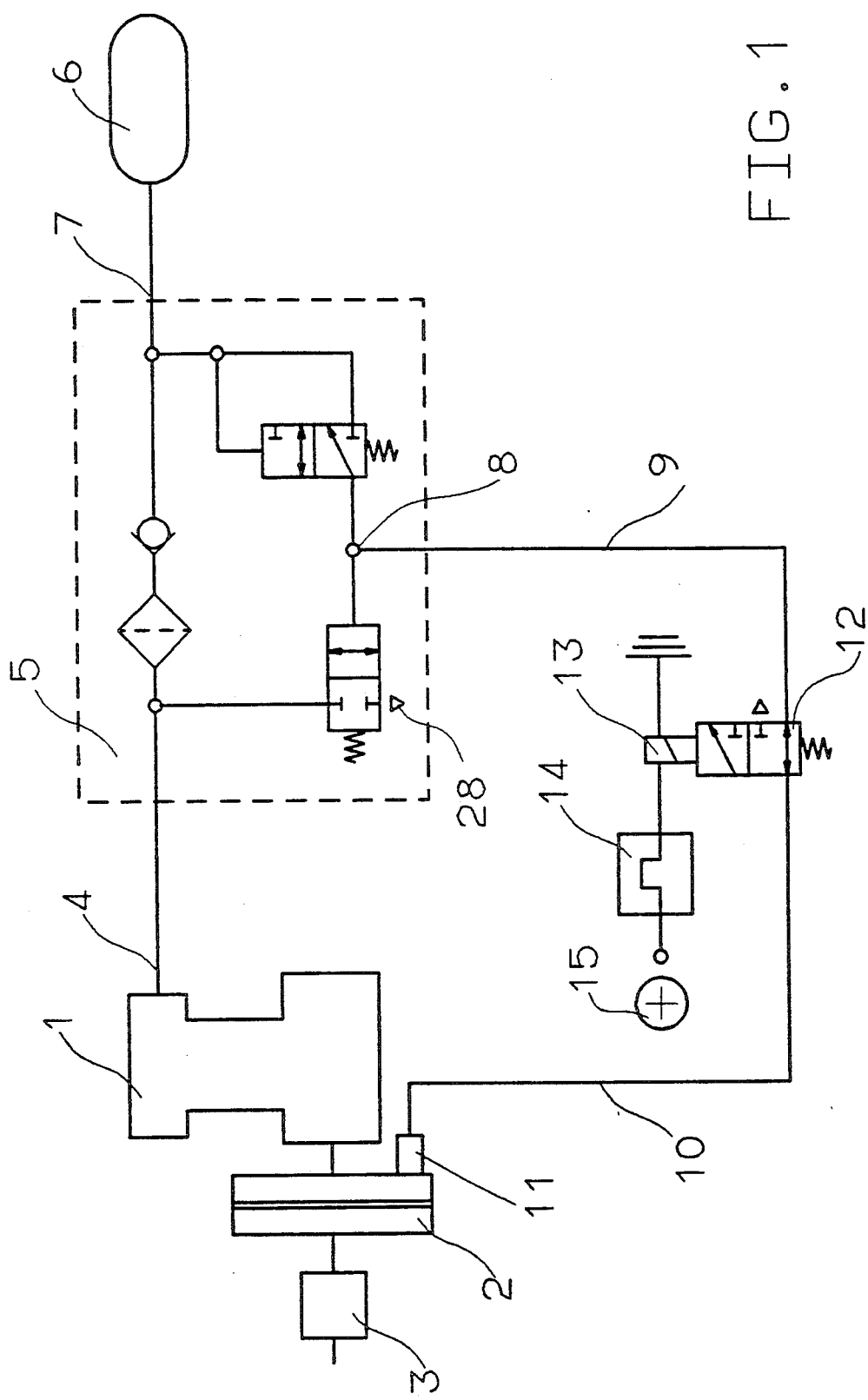
FIG. 1 is a schematic diagram of a device for generation of compressed air with a temperature-dependent switching device for a pneumatically actuatable shut-off coupling of a compressor.

The device of the present invention serves to prevent a freezing of line sections in compressed-air supply lines.

A device for the generation of compressed air comprises a compressor which supplies air via a pressure line to a user. A pressure controller is disposed in the pressure line. The pressure controller blocks a supply stream from the compressor to the user through a user-side pressure and diverts said supply stream into the atmosphere upon reaching or, respectively, surpassing of a preset and defined pressure value. The compressor can be separated from its drive via a switchable coupling. A coupling control device is made up of the pressure controller 5, a directional control valve 12, and a temperature-dependent switching device 14 or, respectively, of the pressure controller 5, a directional control valve 19, and a temperature-dependent switching device 29 or, respectively, of the pressure controller 5, an electric, pneumatically actuatable pressure switch 23, and a temperature-dependent switching device 30. The coupling control device is furnished for controlling switching means for a coupling. A temperature-dependent signal and a signal, derived from a pressure prevailing at the user side, is fed to the coupling control device. The coupling control device serves for joining the two signals such that the coupling separates the compressor from its drive in each case the ambient temperature is above a preset temperature value and the user-side pressure is above a preset user-side pressure.

The coupling 2 can be formed as a pneumatically actuatable shut-off coupling 2. The shut-off coupling 2 can be charged with the user-side pressure for separation of the compressor 1 from its drive 3 at a pneumatic control input 11. The charging of the shut-off coupling 2 with the user-side pressure can be performed via the directional control valve 12, 19. The directional control valve can be actuatable by the temperature-sensitive switching device.

The directional control valve 12 can be electrically controlled and can be disposed between the pneumatic control input 11 and a control output port 8 of the pressure controller 5. The control output port 8 can carry the user-side pressure. The electric control of the directional control valve 12 can be performed via the temperature-dependent switching device 14. The pressure controller 5 can be structured such that the control output port 8 can carry the pressure on the user side only in such cases where the supply stream from the compressor to the user is blocked versus the user.

The directional control valve 19 can be provided electrically controllable and can be disposed between the pneumatic control input 11 and the output of the pressure controller 5 feeding the user 6. The electric control of the directional control valve 19 can be performed via a series circuit made of the temperature-dependent switching device 29 and of the pneumatically actuatable pressure switch 17. The pneumatically actuatable pressure switch 17 can exhibit a pneumatic control input port 16. The pneumatic control input port 16 can be connected with the control output port 8 of the pressure controller 5. The control output port 8 can carry the user-side pressure. The pressure controller 5 can be formed such that the control output port 8 can carry the user-side pressure only when the supply stream from the compressor to the user is blocked versus the user.

The coupling 22 can be formed as an electrically actuatable shut-off coupling, 22. The compressor 1 can be separated from its drive 3 in a currentless state of the electric actuating device of the coupling 22. The electric control input 24 can be connected via a temperature-dependent switching device 30 to an electric energy source 15. The electric, pneumatically actuatable pressure switch 23 can be disposed parallel to the temperature-dependent switching device 30. The pressure switch 23 can exhibit a pneumatic control input port 31. The control input port 31 can be connected with a control output port 8 of the pressure controller 5. The control output port 8 can carry the pressure on the user side. The pressure controller 5 can be structured such that the control output port 8 can carry the user-side pressure only when the supply stream from the compressor to the user is blocked versus the user.

FIG. 1 illustrates a compressor 1, a pneumatically actuatable shut-off coupling 2, and a drive 3. The compressor 1 can be separated by the coupling 2 from its drive 3. The compressor 1 is connected via a pressure line 4 to a pressure controller 5, which is illustrated by way of a schematic block circuit diagram employing standard device drawing symbols. The pressure controller 5 is connected to a user 6, illustrated as a storage container, via a pressure line 7. The pressure line 4 can be vented into the atmosphere via a discharge or output port 28 of the pressure controller 5.

The automatic pressure controller 5 exhibits a pneumatic control output port 8 for controlling the pressure on the user side. The pneumatic control output port 8 can be controlled via control line sections 9 and 10 for actuating the shut-off coupling 2 at the pneumatic control input 11. The compressor 1 is separated from its drive 3 in case of a pressure charging of the coupling 2 with compressed air.

An electrically actuatable directional control valve 12 is furnished which, in its first switch position, connects the line sections 9 and 10 with each other and, in its second switch position, blocks the line section 9 versus the line section 10 and connects the line section 10 to the atmosphere.

The directional control valve 12 exhibits an electric control input 13, which can be connected via a temperature-dependent switching device 14 to an electric energy source 15. The temperature-dependent switching device 14 is furnished such that, below a predetermined ambient temperature, a connection is furnished from the electric control input 13 to the energy source 15.

Figure 2:
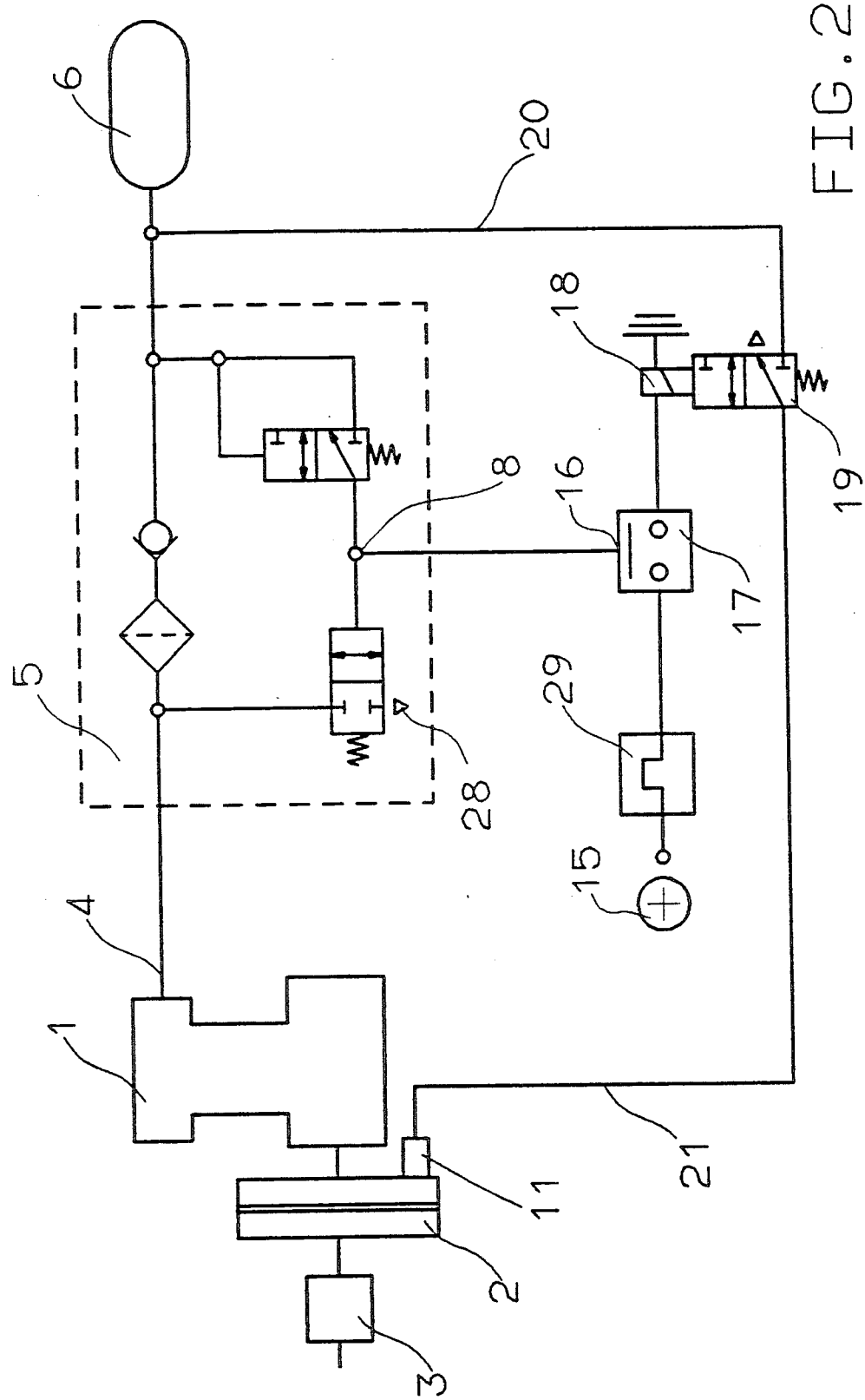
FIG. 2 is a schematic diagram of a second embodiment similar to the embodiment of FIG. 1.

FIG. 2 illustrates an embodiment of the same construction as that of FIG. 1 relative to the compressor 1 with the shut-off coupling 2, the drive 3, as well as the pressure controller 5 and the user 6. However, in this case, the pneumatic control output port 8 of the pressure controller 5 is connected to a pneumatically actuatable pressure switch 17. The pneumatically actuatable pressure switch 17 connects, in case of charging with pressure, the electric control input 18 of an electrically actuatable directional control valve 19 to the temperature-dependent switching device 29.

In case of a current-carrying control input 18, the direction control valve 19 connects the line sections 20 and 21 by way of which a switching pressure can be supplied from the user 6 to the control input 11 of the coupling 2, which switching pressure corresponds to the pressure on the user side.

In case of a currentless control input 18, the directional control valve 19 assumes a switching position, in which the line section 20 is blocked versus the line section 21 and wherein the line section 21 is connected to the atmosphere.

In contrast to the temperature-dependent switching device 14 of the compressed-air supply device according to FIG. 1, a temperature-dependent switching device 29 is furnished in the compressed-air supply device according to FIG. 2. The temperature-dependent switching device 29 interrupts the connection of the electric control input 18 with the energy source 15 below a predetermined ambient temperature.

Instead of furnishing the control output port 8 at the pressure controller 5, the control output port 8 of the pressure controller 5 can also be disposed in the line furnished between the pressure controller 5 and the user 6. For example, in connection with a pressure-dependent switching valve, the control output port 8 of the pressure controller 5 can control a pressure upon reaching of a predetermined pressure at a user.

Figure 3:
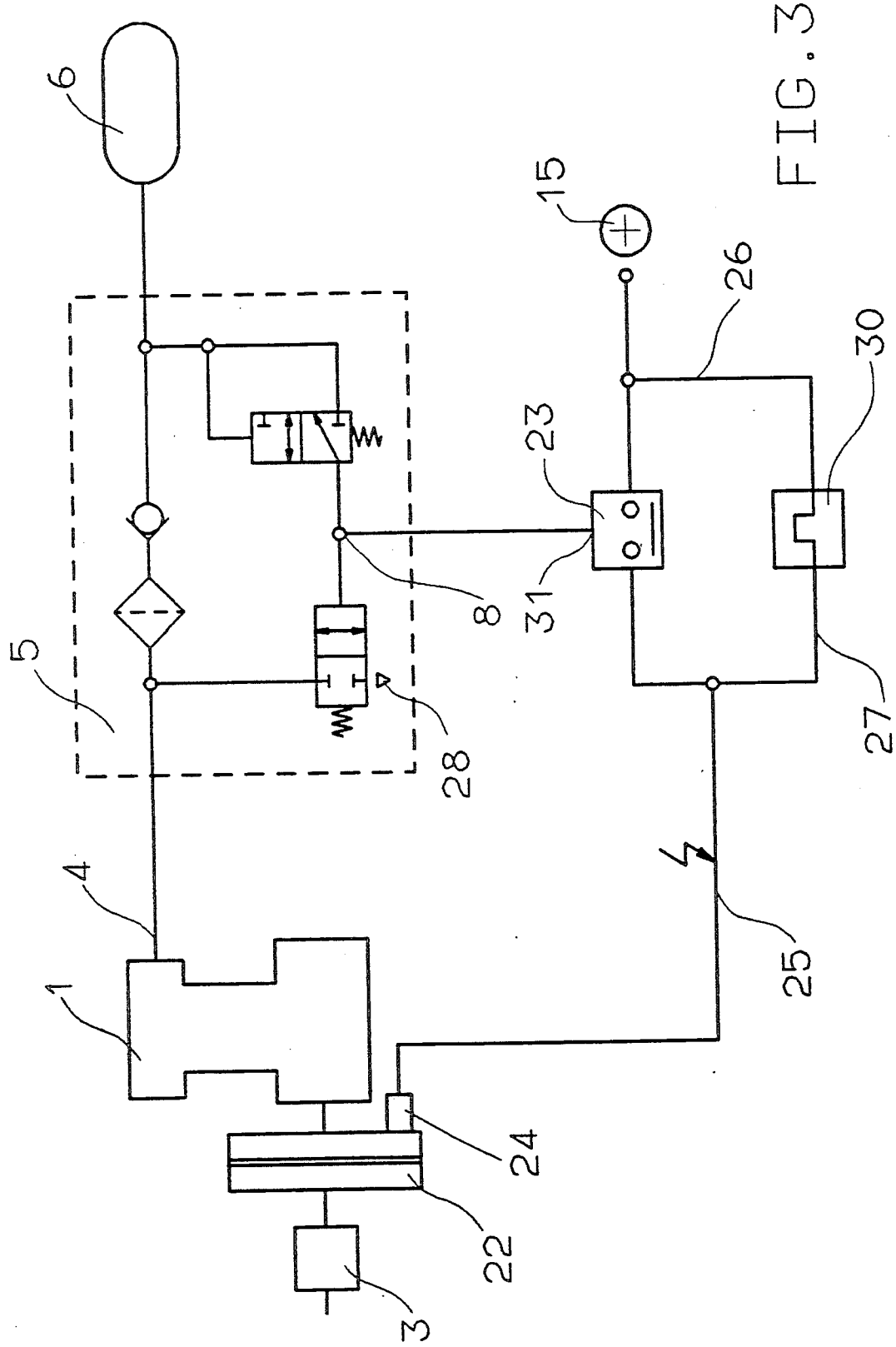
FIG. 3 is a schematic diagram of an embodiment according to FIG. 1, however, employing an electrically actuatable shut-off coupling of the compressor.

According to the embodiment illustrated in FIG. 3, the coupling 22 is furnished as an electromagnetic switch coupling with an electric control input 24 where the compressor is separated from its drive in a currentless state of the electric actuating device.

There is further provided an electric switch 23 controllable with the user-side pressure via a pneumatic control input 31. The electric actuating device of the coupling 22 is connectable to the energy source 15 by means of the electric switch 23 via the electric line section 25. The electric, pneumatically actuatable pressure switch 23 is formed such that, upon its charging with the user-side pressure, the electric actuating device of the coupling is separated from the energy source 15.

The temperature-dependent switching device 30 is disposed in the current circuit between the energy source 15 and the coupling 22 in a direction parallel to the electric switch 23. Below the predetermined temperature, the electric line sections 26, 27, and 25 of the connection from the energy source 15 to the coupling 22 are connected to each other by means of the temperature-dependent switching device 30.

The control components, comprised of pressure controller 5, direction control valve 12, and temperature-dependent switching device 14 in FIG. 1, as well as the control components, comprised of pressure controller 5, pneumatically actuatable pressure switch 17, and temperature-dependent switching device 29 in FIG. 2, as well as the control components, comprised of pressure controller 5, temperature-dependent switching device 30, and electric, pneumatically actuatable pressure switch 23 in FIG. 3, form a coupling control device. The coupling control device serves for the automatic control of the electric control input 11 in FIG. 1 and FIG. 2 or, respectively, of the control input 24 in FIG. 3. A signal derived from the user-side pressure is coupled to a temperature-dependent signal such that the coupling separates the compressor from its drive if the ambient temperature falls below a preset temperature value and if the pressure on the user-side is disposed above a preset user-side pressure.

The mode of operation according to FIG. 1 is as follows.

If a user-side pressure falls below a preset pressure, then the compressor 1 is connected to its drive 3. The compressor 1 supplies air via the pressure connection, comprised of pressure line 4, 7, and pressure controller 5, to the user 6 in this state. The control output port 8 of the pressure controller 5 is without pressure during the supply phase.

Upon reaching of a preset user-side pressure, the pressure controller 5 assumes a switching position in which the pressure line 7 is blocked versus the pressure line 4, and the pressure line 4 is connected via the output port 28 to the atmosphere. In this switching position of the pressure controller 5, the user-side pressure is present at the control output port 8. The user-side pressure is now led and propagated via the pressure line section 9, the directional control valve 12, switched to open passage, and the pressure line section 10 to the pneumatic control input 11. The compressor 1 is thereby separated from its drive 3 by uncoupling of the coupling 2.

Below the preset ambient temperature, the temperature-dependent switching 14 connects the electric control input 13 to the energy source 15. The directional control valve 12 assumes therewith a switching position, wherein the control input 11 is connected to the atmosphere and wherein the coupling 2 is in coupling position. The compressor 1 now supplies the air, warmed-up by the operating temperature of the compressor, via the pressure line 4 and the pressure controller 5 through the output port 28 into the atmosphere. Thereby, the pressure line 4 and the pressure controller 5 in the operating phase are protected against freezing and icing while no air is transported to the user 6.

A pressure is present at the control output port 8 and at the pneumatic control input port 16 in the operating phase according to FIG. 2, during which operating phase no air is supplied from the compressor 1 to the user 6. The pneumatically actuatable pressure switch 17 thereby assumes a switching position connecting the electric control input 18 of the directional control valve 19 to the energy source 15 via the temperature-dependent switching device 29, and wherein the directional control valve 19 is switched to open passage.

Below a preset ambient temperature, the temperature-dependent switching device 29 opens, whereby the directional control valve 19, separated from the energy source 15, assumes a switching position in which the pressure line section 21 is venting into the atmosphere and the coupling 2 is in a coupling position.

The electric, pneumatically actuatable pressure switch 23 is charged with pressure via the control output port 8 in the operating phase according to FIG. 3 in which no air is supplied from the compressor 1 to the user 6. The connection of the energy source 15 to the coupling 22 is thereby interrupted, the coupling 22 is uncoupled, and the compressor 1 is separated from its drive 3. The temperature-dependent switching device 30 is closed below the preset ambient temperature, i.e. the connection of the energy source 15 to the coupling 22 is reestablished such that the compressor 1 supplies warm air via the pressure line 4 and the output port 28 into the atmosphere.

It will be understood that each of the elements described above, or two or more together, may also find a useful application in other types of devices for the generation of compressed air differing from the types described above.

While the invention has been illustrated and described as embodied in the context of a device for the generation of compressed air with a temperature-dependent switching device for a pneumatically or electrically actuatable shut-off coupling of the compressor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for the generation of compressed air comprising
    a pressure line having an end connected to a user;
    a compressor connected to the pressure line for supplying air via a pressure line to the user;
    a pressure controller disposed in the pressure line, which pressure controller is capable of blocking a supply stream from the compressor to the user through a user-side pressure and of diverting said supply stream into the atmosphere upon reaching or, respectively, surpassing of a preset and defined pressure value;
    a switchable coupling connected to the compressor and by way of which the compressor can be separated from its drive;
    a switching means for connecting to the switchable coupling;
    a coupling control device connected to the switching means for controlling the switching means;

a temperature sensor connected to the coupling control device for furnishing an ambient temperature-dependent signal;

a pressure sensor communicating the pressure in the pressure line on its end toward the user and furnishing a pressure signal, derived from a pressure prevailing at the user side, wherein the temperature dependent signal and the pressure signal are fed to the coupling control device, wherein the coupling control device serves for combining the two signals such that the coupling separates the compressor from its drive in case the ambient temperature is above a preset temperature value and the user-side pressure is above a preset user-side pressure.

2. The device according to claim 1, wherein the switchable coupling is formed as an electrically actuatable shut-off coupling, wherein the compressor is separated from its drive in a currentless state of the electric actuating device of the shut-off coupling;

wherein the electric control input can be connected via a temperature-dependent switching device to an electric energy source;

wherein an electric, pneumatically actuatable pressure switch is disposed parallel to the temperature-dependent switching device;

wherein the pressure switch exhibits a pneumatic control input port, which control input port is connected to a control output port of the coupling control device, where the control output port carries the pressure on the user side; and wherein the coupling control device includes pressure control means restricting the user-side pressure carried by the control output port to only cases where the supply stream from the compressor to the user is blocked versus the user.

3. A device for the generation of compressed air comprising a first pressure line connected to the compressor;

a series connection of a fluid conditioner and of a check valve connected at a first end to the first pressure line;

a second pressure line connected to a second end of the series connection of fluid conditioner and check valve;

a two-way valve connected to the first pressure line;

a control output port connected to the two-way valve;

a first directional control valve connected with one side to the control output port and with a second side to the second pressure line;

a coupling connected to the compressor;

a compressor drive connected for providing energy to the coupling;

a control input disposed at the compressor drive for receiving control signals for the coupling;

temperature-sensitive switching means connected on a first side to the control output port and connected on a second side to the control input.

4. The device according to claim 3, wherein the temperature-sensitive switching means comprises a first electric line section connected to the control input formed as an electric control input;

an electric switch connected to the first electric line section;

a pneumatic control input disposed at the electric switch and connected to the control output port;

an electrical energy source connected to the electric switch;

a second electric line section connected to the first electric line section;

a temperature-sensitive switching device connected to the second line section;

a third electric line section connected to the temperature-sensitive switching device and connected to the electric energy source.

5. The device according to claim 3, wherein the temperature-sensitive switching means comprises a first pneumatic line section connected to the control input formed as a pneumatic input;

a directional control valve having a port side connected to the first pneumatic line section;

a second pneumatic line section having an end connected to a second side of the directional control valve and connected with a second end to the control output port;

a second control input disposed at the directional control valve;

a temperature-sensitive switching device connected to the second control input;

an energy source connected to the temperature-sensitive switching device for energizing the temperature-sensitive switching device.

6. The device according to claim 3, wherein the temperature-sensitive switching means comprises a first pneumatic line section connected to the control input formed as a pneumatic control input;

a directional control valve having a port side connected to the first pneumatic line section;

a second pneumatic line section having an end connected to a second side of the directional control valve and connected with a second end to the second pressure line;

a second control input disposed at the directional control valve;

a pressure switch connected to the control input port and to the second control input;

a temperature-sensitive switching device connected to the pressure switch; an energy source connected to the temperature-sensitive switching device for energizing the temperature-sensitive switching device.

7. A device for the generation of compressed air comprising a pressure line having an end connected to a user;

a compressor connected to the pressure line for supplying air via a pressure line to the user;

a pressure controller disposed in the pressure line, which pressure controller is capable of blocking a supply stream from the compressor to the user through a user-side pressure and of diverting said supply stream into the atmosphere upon reaching or, respectively, surpassing of a preset and defined pressure value;

a switchable coupling connected to the compressor and by way of which the compressor can be separated from its drive;

a switching means for connecting to the switchable coupling;

a coupling control device connected to the switching means for controlling the switching means;

a temperature sensor connected to the coupling control device for furnishing an ambient temperature-dependent signal;

a pressure sensor communicating the pressure in the pressure line on its end toward the user and furnishing a pressure signal, derived from a pressure prevailing at the user side, wherein the temperature dependent signal and the pressure signal are fed to the coupling control device, wherein the coupling control device serves for combining the two signals such that the coupling separates the compressor from its drive in case the ambient temperature is above a preset temperature value and the user-side pressure is above a preset user-side pressure, wherein the switchable coupling is formed as a shut-off coupling, and wherein the coupling control device further comprises a directional control valve connected to the pneumatic control input, wherein the charging of the shut-off coupling with the user-side pressure is performed via the directional control valve; and a temperature-sensitive switching device, wherein the directional control valve is actuatable by the temperature-sensitive switching device.

8. The device according to claim 7, wherein the shut-off coupling is pneumatically actuatable, and wherein the shut-off coupling is charged with the user-side pressure for separation of the compressor from its drive at a pneumatic control input.

9. The device according to claim 8, further comprising a control output port connected to the coupling control device, wherein the directional control valve is electrically controlled and disposed between the pneumatic control input and a control output port, wherein the control output port carries the user-side pressure;

wherein the electric control of the directional control valve is performed via the temperature-dependent switching device;

wherein the pressure controller transmits the pressure on the user side to the switchable coupling only in such cases where the supply stream from the compressor to the user is blocked for the user.

10. The device according to claim 8, wherein the directional control valve is provided electrically controllable and is disposed between the pneumatic control input and the output of the pressure controller feeding the user;

wherein the electric control of the directional control valve is performed via a series circuit made of a temperature-dependent switching device and of a pneumatically actuatable pressure switch;

wherein the pneumatically actuatable pressure switch exhibits a pneumatic control input port, which pneumatic control input port is connected with a control output port of the pressure controller, where the control output port carries the user-side pressure;

wherein the pressure controller is formed such that the control output port carries the user-side pressure only when the supply stream from the compressor to the user is blocked versus the user.

11. A device for the generation of compressed air comprising a compressor which supplies air via a pressure line to a user;

a pressure controller disposed in the pressure line, which pressure controller is capable of blocking a supply stream from the compressor to the user through a user-side pressure and of diverting said supply stream into the atmosphere upon reaching or, respectively, surpassing of a preset and defined pressure value;

a switchable coupling, via which the compressor can be separated from its drive;

a coupling control device, where the coupling control device is made up of the pressure controller, a directional control valve, a temperature-dependent switching device or, respectively, the pressure controller, a directional control valve, a temperature-dependent switching device or, respectively, the pressure controller, an electric pneumatically actuatable pressure switch, a temperature-dependent switching device, wherein the coupling control device is furnished for controlling switching means for a coupling, where a temperature-dependent signal and a signal, derived from a pressure prevailing at the user side, is fed to the coupling control device, wherein the coupling control device serves for joining the two signals such that the coupling separates the compressor from its drive in case the ambient temperature is above a preset temperature value and the user-side pressure is above a preset user-side pressure.

12. The device according to claim 11, wherein the coupling is formed as an electrically actuatable shut-off coupling, wherein the compressor is separated from its drive in a currentless state of the electric actuating device of the coupling;

wherein the electric control input can be connected via a temperature-dependent switching device to an electric energy source;

wherein the electric, pneumatically actuatable pressure switch is disposed parallel to the temperature-dependent switching device;

wherein the pressure switch exhibits a pneumatic control input port, which control input port is connected with a control output port of the pressure controller, where the control output port carries the pressure on the user side;

wherein the pressure controller is structured such that the control output port carries the user-side pressure only when the supply stream from the compressor to the user is blocked versus the user.

13. The device according to claim 11, wherein the switchable coupling is formed as a pneumatically actuatable shut-off coupling, and where the shut-off coupling can be charged with the user-side pressure for separation of the compressor from its drive at a pneumatic control input, and wherein the charging of the shut-off coupling with the user-side pressure is performed via the directional control valve, which directional control valve is actuatable by the temperature-sensitive switching device.

14. The device according to claim 13, wherein the directional control valve is provided electrically controllable and is disposed between the pneumatic control input and the output of the pressure controller feeding the user;

the electric control of the directional control valve is performed via a series circuit made of the temperature-dependent switching device and of the pneumatically actuatable pressure switch;

wherein the pneumatically actuatable pressure switch exhibits a pneumatic control input port, which pneumatic control input port is connected with the control output port of the pressure controller, where the control output port carries the user-side pressure;

the pressure controller is formed such that the control output port carries the user-side pressure only when the supply stream from the compressor to the user is blocked versus the user.

15. The device according to claim 13, wherein the directional control valve is electrically controlled and disposed between the pneumatic control input and a control output port of the pressure controller, wherein the control output port carries the user-side pressure;

the electric control of the directional control valve is performed via the temperature-dependent switching device;

the pressure controller is structured such that the control output port carries the pressure on the user side only in such cases where the supply stream from the compressor to the user is blocked versus the user.

16. A method for controlling a generation of compressed air comprising setting a preset and defined pressure value to control a flow of a compressed air supply stream;
setting a preset ambient temperature value;
energizing a compressor connected to a pressure line for supplying air via a pressure line to the user;
communicating the pressure in the pressure line on its end toward the user to a pressure sensor;
deriving a pressure signal with the pressure sensor from a pressure prevailing at the user side;
generating an ambient temperature-dependent signal with a temperature sensor connected to the coupling control device;
feeding the temperature dependent signal and the pressure signal to the coupling control device;
combining the pressure signal and the temperature signal in the coupling control device;
separating the compressor from its drive via the combined signal from the coupling control device in case the ambient temperature is above the preset temperature value and the user-side pressure is above the preset user-side pressure.

17. The method for controlling a generation of compressed air according to claim 16, further comprising
actuating a coupling control device connected to the switching means for controlling the switching means;
connecting and disconnecting the switching means for engaging and disengaging the switchable coupling.

18. The method for controlling a generation of compressed air according to claim 16, further comprising
blocking a supply stream from the compressor to the user with a pressure controller disposed in the pressure line based on a pressure signal provided by a pressure sensor sensing the pressure prevailing on a user-side;
diverting said supply stream into the atmosphere upon reaching or, respectively, surpassing of the preset and defined pressure value.

19. The method of controlling a generation of compressed air according to claim 16, further comprising electrically controlling a directional control valve disposed between the pneumatic control input and the output of the pressure controller feeding the user, and wherein the electric control of the directional control valve is performed via a series circuit made of a temperature-dependent switching device and of a pneumatically actuatable pressure switch, and wherein the pneumatically actuatable pressure switch exhibits a pneumatic control input port, which pneumatic control input port is connected with a control output port of the pressure controller, where the control output port carries the user-side pressure, and wherein the pressure controller is formed such that the control output port carries the user-side pressure only when the supply stream from the compressor to the user is blocked versus the user.

20. The method for controlling a generation of compressed air according to claim 16, further comprising
separating the compressor from its drive in a currentless state of the electric actuating device of the coupling formed as an electrically actuatable shut-off coupling;
connecting the electric control input via a temperature-dependent switching device to an electric energy source, wherein an electric, pneumatically actuatable pressure switch is disposed parallel to the temperature-dependent switching device, and wherein the pressure switch exhibits a pneumatic control input port, which control input port is connected to a control output port of the coupling control device, where the control output port carries the pressure on the user side; and
restricting the user-side pressure carried by the control output port to only cases where the supply stream from the compressor to the user is blocked versus the user with pressure control means included in the coupling control device.

21. The method for controlling a generation of compressed air according to claim 16, wherein the coupling control device is formed as a pneumatically actuatable shut-off coupling and further comprising
charging the shut-off coupling with the user-side pressure for separation of the compressor from its drive at a pneumatic control input.

22. The method for controlling a generation of compressed air according to claim 21, further comprising
connecting a control output port to the coupling control device;
electrically controlling the directional control valve disposed between the pneumatic control input and a control output port, wherein the control output port carries the user-side pressure, wherein the electric control of the directional control valve is performed via the temperature-dependent switching device;
transmitting the pressure on the user side only in such cases where the supply stream from the compressor to the user is blocked for the user with a pressure control means, wherein the pressure control means forms part of the coupling control device.

* * * * *